United States Patent
O'Brien

(10) Patent No.: US 9,225,885 B2
(45) Date of Patent: Dec. 29, 2015

(54) REDUCED HEIGHT CAMERA MODULE FOR SMALL FORM FACTOR APPLICATIONS

(71) Applicant: Paul O'Brien, Sammamish, WA (US)

(72) Inventor: Paul O'Brien, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 62 days.

(21) Appl. No.: 14/149,734

(22) Filed: Jan. 7, 2014

(65) Prior Publication Data

US 2014/0368711 A1    Dec. 18, 2014

Related U.S. Application Data

(60) Provisional application No. 61/835,484, filed on Jun. 14, 2013.

(51) Int. Cl.
    *H04N 5/225*      (2006.01)
    *G02B 27/00*      (2006.01)

(52) U.S. Cl.
    CPC ......... *H04N 5/2254* (2013.01); *Y10T 29/49826* (2015.01)

(58) Field of Classification Search
    CPC . H04N 5/2254; H04N 5/2171; G02B 27/0006
    See application file for complete search history.

(56) References Cited

U.S. PATENT DOCUMENTS

| | | | |
|---|---|---|---|
| 7,773,876 B2 | 8/2010 | Westerweck et al. | |
| 7,873,269 B2 | 1/2011 | Toor et al. | |
| 8,279,335 B2 | 10/2012 | Cao | |
| 8,368,255 B2 | 2/2013 | Park et al. | |
| 2008/0174690 A1* | 7/2008 | Chang | G02B 7/102 348/345 |
| 2008/0180814 A1 | 7/2008 | Kawasaki | |
| 2010/0091392 A1 | 4/2010 | Jung et al. | |
| 2013/0148011 A1* | 6/2013 | Chou | H04N 5/2254 348/357 |
| 2013/0155311 A1* | 6/2013 | Grandin | H04N 5/2257 348/335 |

FOREIGN PATENT DOCUMENTS

| | | | | |
|---|---|---|---|---|
| EP | 1304872 | 4/2003 | | |
| EP | 1471730 | 10/2004 | | |
| EP | 1662276 | 5/2006 | | |
| JP | 2006-251577 A | * | 9/2006 | ............. H04N 5/225 |
| JP | 2006251577 | 9/2006 | | |
| JP | 2010232941 | 10/2010 | | |

OTHER PUBLICATIONS

English Translation of JP 2006-251577.*

(Continued)

*Primary Examiner* — Lin Ye
*Assistant Examiner* — John H Morehead, III
(74) *Attorney, Agent, or Firm* — Judy Yee; Micky Minhas

(57) ABSTRACT

A camera module for a mobile device includes a cover, a base and a lens module. The cover has an outer side from which an annular axial extension protrudes. The axial extension defines a lens opening and a lens movement axis. The axial extension has an outer end surface defining an outer end of the camera module. The outer side of the cover laterally adjacent the axial extension defines a gasket sealing surface against which a gasket can be compressed for sealing. The base defines an inner end of the camera module opposite the outer end. The lens barrel is positioned within the module and driveable to extend and retract relative to the base and within the axial extension. The lens barrel at an outermost position is axially recessed from the end surface of the axial extension and is laterally separated from the gasket sealing surface by the axial extension.

20 Claims, 8 Drawing Sheets

(56) References Cited

OTHER PUBLICATIONS

Toshiba, "Toshiba Announces Thinnest Camera Module with High Resolution, 13 Mega Pixel, Image Sensor for Top-Quality Pictures," http://www.toshiba.com/taec/news/press_releases/2013/assp_13_670.jsp (Apr. 2, 2013).

"International Search Report and Written Opinion Received for PCT Application No. PCT/US2014/041818," Mailed Oct. 17, 2014, 19 Pages. (MS# 339253.03).

"International Preliminary Report on Patentability Issued in PCT Application No. PCT/US2014/041818," Mailed Date: Jun. 22, 2015, 6 Pages. (MS# 339253.03).

* cited by examiner

REDUCED HEIGHT CAMERA MODULE FOR SMALL FORM FACTOR APPLICATIONS

CROSS REFERENCE TO RELATED APPLICATION

This application claims the benefit of U.S. Provisional Patent Application No. 61/835,484, filed on Jun. 14, 2013, which is incorporated herein by reference.

BACKGROUND

Today's mobile devices often include at least one camera. Mobile phones, tablets, laptops and other types of portable electronic devices include camera functionality because it greatly extends the uses of these devices and offers many conveniences to users. In turn, users have demanded greater resolution and more autofocus capability in mobile device cameras.

The camera module of a current mobile device is often the component that defines the overall height or thickness of such a small form factor device. On the one hand, it is desirable to maintain this dimension as small as possible to allow the mobile device to maintain a small form factor, especially a thin profile. On the other hand, designers of camera modules with a moving component are attempting to increase this dimension to provide the greater resolution and other camera capability users are seeking. At the same time, it is important to protect the moving component (e.g., a lens barrel) from damage, such as from contact with other components in the event that the mobile device suffers an impact.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described below are implementations of a camera module for a mobile device that includes a cover, a base and a lens module. The cover has an outer side from which an annular axial extension protrudes. The axial extension defines a lens opening and a lens movement axis. The axial extension has an outer end surface defining an outer end of the camera module. The outer side of the cover laterally adjacent the axial extension defines a gasket sealing surface against which a gasket can be compressed for sealing. The base defines an inner end of the camera module opposite the outer end. The lens barrel is positioned within the camera module and driveable to extend and retract relative to the base and within the axial extension. The lens barrel at an outermost position is axially recessed from the end surface of the axial extension and is laterally separated from the gasket sealing surface by the axial extension.

The sealing surface can be configured for positioning opposite a periphery of a camera window of a mobile device with a gasket positioned between the sealing surface and the periphery of the camera window.

The cover and the annular extension can be formed as a single-piece construction. The axial extension can be joined to the sealing surface at a shoulder, and the shoulder can be configured to remain inwardly spaced from the gasket.

In some implementations, a height of the camera module measured from the base to the outer end surface is at least about 0.2 mm less than a comparable conventional camera module height. In some implementations, the height of the camera module measured from the base to the outer end surface is at least about 0.4 mm less than the comparable conventional camera module height. Stated differently, the distance by which the lens barrel in its outermost position can be extended beyond the sealing surface is at least 0.2 mm or at least about 0.4 mm.

According to another implementation, a mobile device with a camera module comprises a mobile device housing portion having a camera window that defines a camera axis, a camera module positioned within the mobile device, and an annular dust gasket. The camera module is generally aligned with the camera window along the camera axis and has an outer sealing surface sized at least as great as the periphery of the camera window. The annular dust gasket is positioned between the sealing surface and the camera window to define a sealed area between the camera module and the camera window. The camera module includes an axial extension extending beyond the outer sealing surface toward the camera window and having an end surface. The camera module has a lens barrel extendable along the camera axis to an outermost position within the axial extension and recessed from the end surface, thereby protecting the lens barrel from shock and contamination.

The housing portion can be a first housing portion defining a rear surface of the mobile device, and the mobile device can comprise a second housing portion defining a front surface arranged opposite the first portion to define an interior space. The camera module can have a base that is positioned in contact with the second housing portion.

The camera module can comprise a one-piece cover that defines the sealing surface and the axial extension. The cover can be made of a metal. The cover can comprise an optional mounting flange on which the sealing surface is defined. The mounting flange can extend laterally outwardly and can comprise at least one aperture for receiving a mounting fastener to secure the camera module in place. In one implementation, the mounting flange has two apertures spaced 180 degrees apart. The cover can comprise a two-step profile.

According to another implementation, a method of assembling a camera module to reduce the height of the mobile device comprises providing a first mobile device housing portion and a camera module. The camera module has a base defining one end and an opposite second end defined by an axial extension with an opening for a lens barrel and a surrounding sealing surface. The method comprises assembling the base of the camera module adjacent an inner surface of the first mobile device housing portion, positioning a gasket on the sealing surface and around the axial extension and providing a second mobile device housing portion with a camera window. Further, the method comprises assembling the second mobile device housing portion with the first mobile device housing portion, with the camera window aligned with the opening and the lens barrel, and with the gasket compressed between the second mobile device housing portion and the sealing surface of the camera module, the lens barrel being extendable away from the base and within the axial extension, and the lens barrel remaining separated from the gasket by the axial extension.

The method can include positioning the base of the camera module in contact with an inner surface of the first mobile device housing portion. The lens barrel can be extendable to an outermost position away from the base and beyond the sealing surface but within the axial extension, thereby reducing the height of the mobile device. The method can further comprise positioning the gasket to contact a shoulder between the sealing surface and the axial extension.

DETAILED DESCRIPTION

Figure 1:
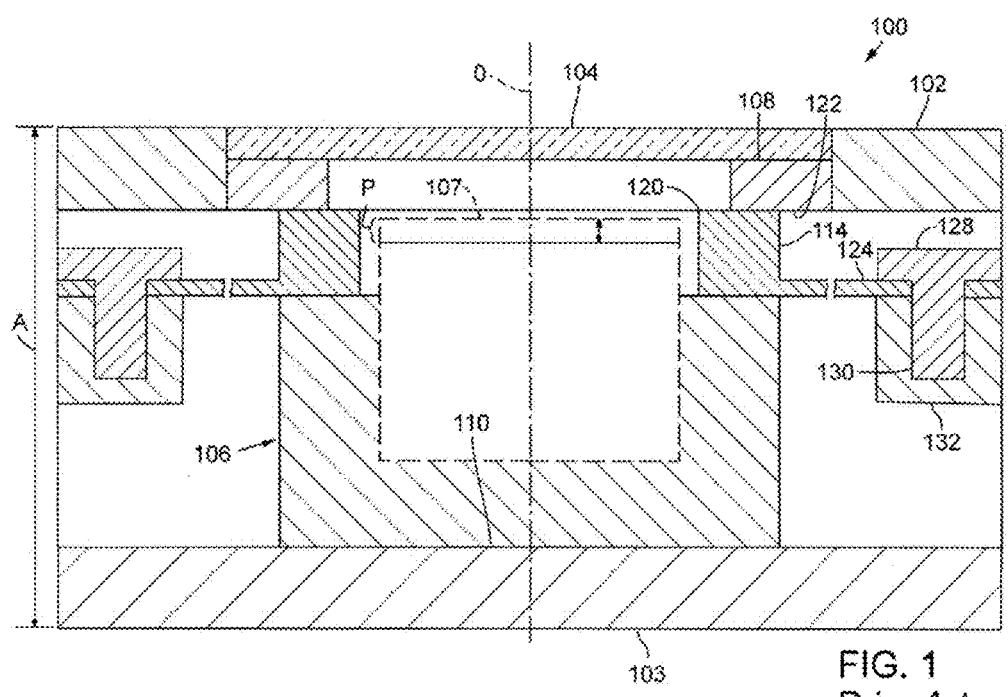
FIG. 1 is a section view in elevation of a portion of a mobile device showing a conventional camera module.

FIG. 1 is a sectioned side elevation view showing a portion of a mobile device 100 having a housing 102 and a camera window 104 mounted in the housing. As illustrated, the housing 102 defines one surface, such as a rear surface, of the mobile device 100. A camera module 106 occupies a majority of an internal distance extending along an optical axis O passing through the camera window 104 between the housing 102 on one end (i.e., a rear housing of the device, which is the upper housing as shown in the figure) and a front housing 103 (which is the lower housing as shown in the figure) on an opposite end against or near which an end surface 110 of the camera module is positioned. A minor yet significant portion of the internal distance between the housings is occupied by a dust gasket 108.

A base of the camera module 106 is in contact with or very closely spaced from the housing 103. The camera module 106 includes components such as a sensor and optical elements (not shown) that are generally arranged along a camera axis and in alignment with the camera window 104. As shown schematically in dashed lines, the camera module 106 has a movable lens barrel 107 with one or more lenses. One type of camera module with movable components uses a voice coil motor (VCM) to effect movement of the lens barrel. Typical lens barrel extension distances can be 0.5 mm or even greater.

The camera module 106 has an axially aligned opening 120 defined at a first end of the module (i.e., the upper end as depicted in FIG. 1). The camera module's lens barrel 107 is configured to be extendable along the axis O, such as during focusing, over a protected range P that does not protrude beyond the opening 120. In this way, the lens barrel remains protected within the camera module 106 over its full range of movement. In the conventional camera module 106, there is a top plate 114 that defines an end of and serves to enclose structures within the camera module 106.

The dust gasket 108 is shaped to surround the opening 120 and thus to reduce dust from entering a space between the camera window 104 and the camera module 106, which might cause the camera module to perform poorly or to malfunction. The first end of the camera module 106 includes a sealing surface 122 extending radially from the opening 120 that supports the dust gasket 108 so that it can be slightly compressed against the camera window 104.

In the FIG. 1 example, this sealing surface 122 is an exterior surface of the top plate 114 (or other uppermost component of the camera module 106). In one representative implementation, the top plate 114 has a flange or other structure, shown generally radially outward of the line break, that extends and defines, e.g., an attachment surface 124. The attachment surface 124 allows the camera module to be secured, such as with one or more fasteners 128 threaded into corresponding bores 130 in a support 132. As shown, the attachment surface 124 is spaced away from both the housing 102 and the housing 103.

In the example of FIG. 1, a distance A is defined to extend from the exterior of the housing 102 on the first side to the exterior of the housing 103 on the second side.

Figure 2:
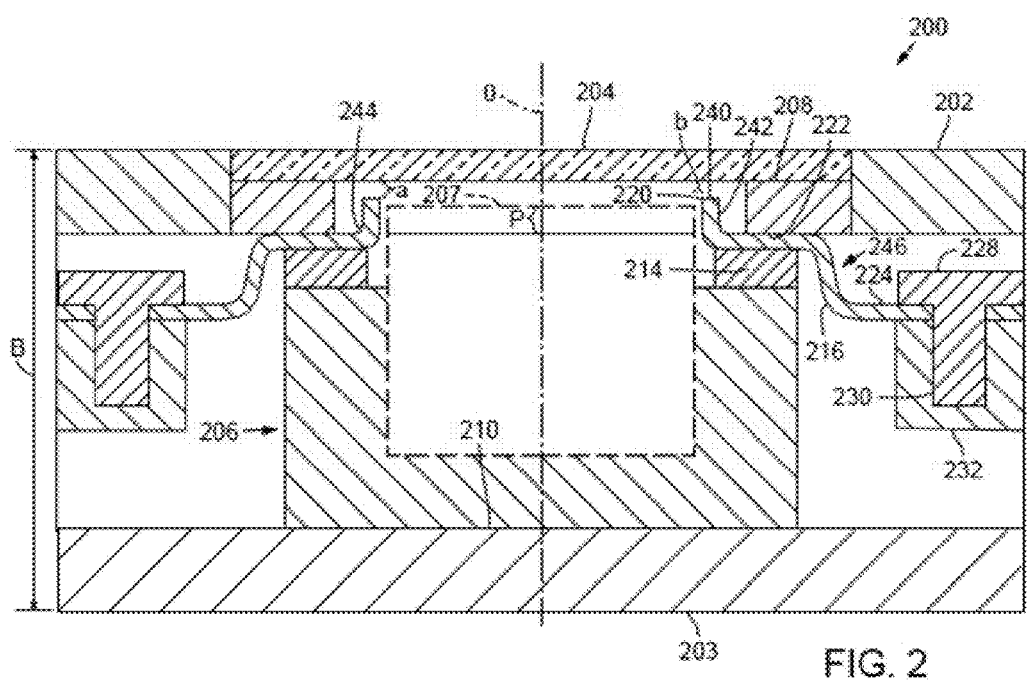
FIG. 2 is a section view in elevation similar to FIG. 1, except showing a new camera module having a reduced height.

FIG. 2 is a sectioned side elevation view showing a portion of a mobile device 200 having a new camera module 206 with a reduced overall height compared to the conventional camera module 106 and a corresponding reduced height (or thickness) of the mobile device 200 compared the mobile device 100. Except as otherwise described, like components in FIG. 2 are given the same reference numeral as in FIG. 1, plus 100.

The distance B, i.e., commonly referred to as the height or thickness of the device, is less than the distance A in the conventional mobile device 100. In one example, the distance B is less than the distance A by about 0.40 mm. In another example, the reduction in height or thickness is about 0.20 mm using the new approach of FIG. 2.

As shown in FIG. 2, there is a radially extending sealing surface 222, but the end of the camera module 206 is defined by an end surface 240 of an axial extension 242. The axial extension can also be referred to as a "chimney." An inner surface of the axial extension 242 defines the opening 220. In the illustrated implementation, the axial extension 242 is joined to an inner edge of the sealing surface 222 at a shoulder 244. In the illustrated implementation, the axial extension 242 is a part of a cover 216, and the cover overlies a top plate 214, but it is of course possible to combine the cover 216 and top plate 214 into a single component. In addition, it is also possible to form the axial extension as a separate component from the 216.

The axial extension 242 is positioned closer to the camera window 204 than the sealing surface 222. As a result, the protected range P over which the lens barrel 207 is movable is positioned closer to the camera window 204 than the same range P in the mobile device 100.

As can be seen, the camera module 206 is positioned close to the camera window 204. In some embodiments, an axial distance or clearance a between the end surface 240 and the camera window 204 is about 0.33 mm.

As can also be seen, there is also a lateral clearance b between the lens barrel and axial extension 242. In some embodiments, the lateral clearance b, measured perpendicular to the axis of the lens barrel, can be about 0.75 mm.

The axial extension 242 can have curved inner and outer surfaces as shown, or another suitable configuration. From the side profile shown in FIG. 2, the cover 216 can be described as having a two-step profile 246.

In the illustrated implementation of FIG. 2, the end surface 210 of the camera module 206 is shown to be positioned in contact with the housing 203. The same reduction in height or thickness of the device is possible, however, even if the end surface 210 is spaced from the housing 203. Also, although the housing 103/203 has been shown generally as a single layer construction, it more typically would be constructed as a multi-layer construction. As a front surface of a device, the housing 103/203 would typically include at least the component layers necessary to implement touch screen capability, as well as to perform the "housing" function.

In the illustrated implementation, the cover 216 is formed of metal and as a single piece, but any equivalent construction having sufficient rigidity for the application yet allowing for minimal material thicknesses can be used. Forming the axial extension 242 of a metal permits the resulting construction to have sufficient strength and rigidity, yet fit within the limited space available, particularly in the radial dimension.

Some implementations of camera modules include an exterior housing made of metal or other electromagnetic interference shielding material and configured to cover one or more sides of the module. In these implementations, it is possible to configure the exterior housing to have a suitable shape and provide the axial extension as described instead or providing a separate cover component.

The gasket 208 can have the same dimensions, and most importantly, the same thickness, as the gasket 108. The components below the cover 216, including the top plate 214 or other similar structure, as well as other components, can have the same configuration as in the conventional camera 106 or another suitable configuration.

The mounting scheme for the camera module 206 shown in FIG. 2, including the radially extending attachment surface 224, the fastener(s) 228, and the bore 234 in the support 230, is representative only. The camera module 206 can be secured within the device 200 with fasteners extending into the housing 202, into the housing 203 and/or into some other component, or, in alternative implementations, without fasteners.

Figure 3A:
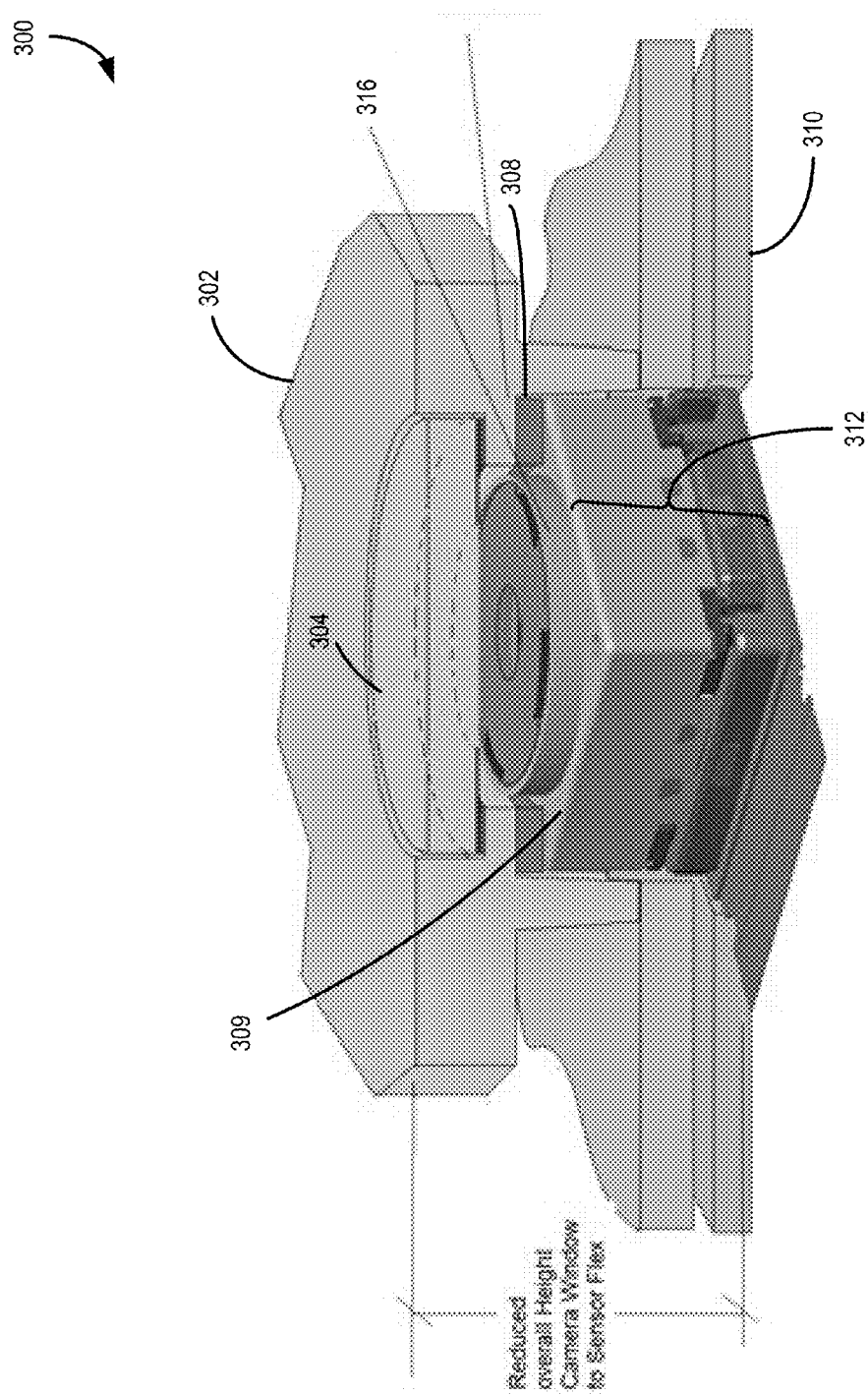
FIG. 3A is a perspective view of another new camera module as installed in a mobile device, which is shown in section for clarity.

FIG. 3A is a perspective view of another new camera module 306 installed in a mobile device 300, which is shown sectioned for clarity. As indicated, the mobile device 300 has a housing 302 defining a rear surface of the device with a camera window 304 mounted therein, and a housing 310 defining a front surface. The chimney 316 protects the lens barrel through the outer range of its extension, which is above a level of the gasket 308 and a corresponding sealing surface 309 that supports it. As a result, the height of the underlying portion of the camera module 306, also referred to as the stack, is reduced compared to a comparable conventional camera module in which the sealing surface is defined at the module's upper end and the lens barrel does not protrude beyond the sealing surface.

Figure 3B:
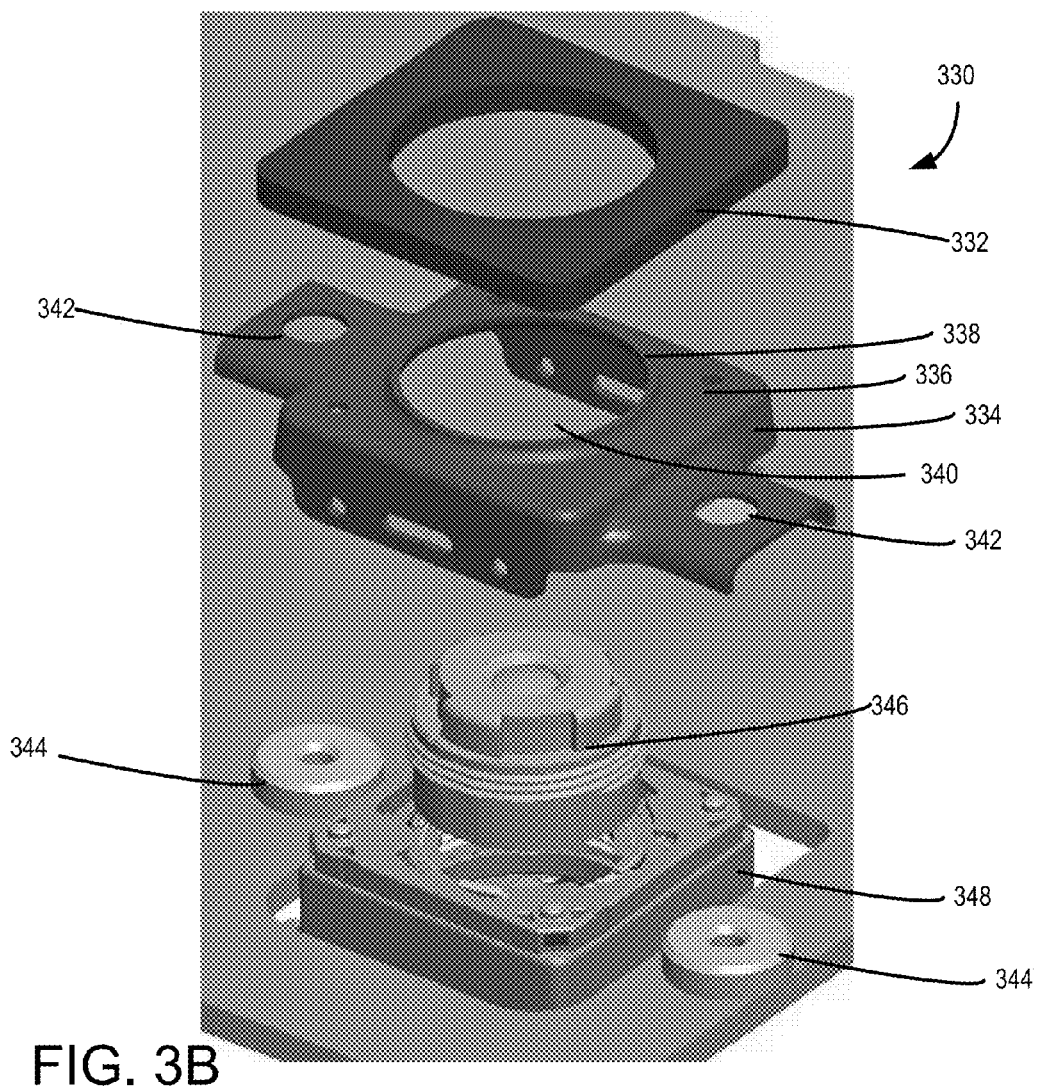
FIG. 3B is an exploded perspective view of a new camera module having a reduced height.

FIG. 3B is an exploded perspective view of another new camera module 330, which is similar to the camera module 306 of FIG. 3B. As shown, there is a gasket 332 having approximately square top and bottom surfaces with a generally circular opening defined therein. A cover 334 has a sealing surface 336 and an annular extension 338 positioned interiorly of the sealing surface 336 and defining an opening 340. The gasket 332 is shaped to seal against the sealing surface 336 and around the annular extension 338. The cover 334 has mounting apertures 342 for mounting the module 330 to mounts 344 within a device with fasteners (not shown). A lens barrel 346 is configured to extend from a lower portion 348 (or stack) of the module and through the opening 340. The lens barrel 346 has an outermost position at which the distal end of the lens barrel is positioned beyond the sealing surface 336. Advantageously, the distal end of the lens barrel 346 can be maintained within the axial extension in the outermost position to protect the lens barrel 346.

Figure 3C:
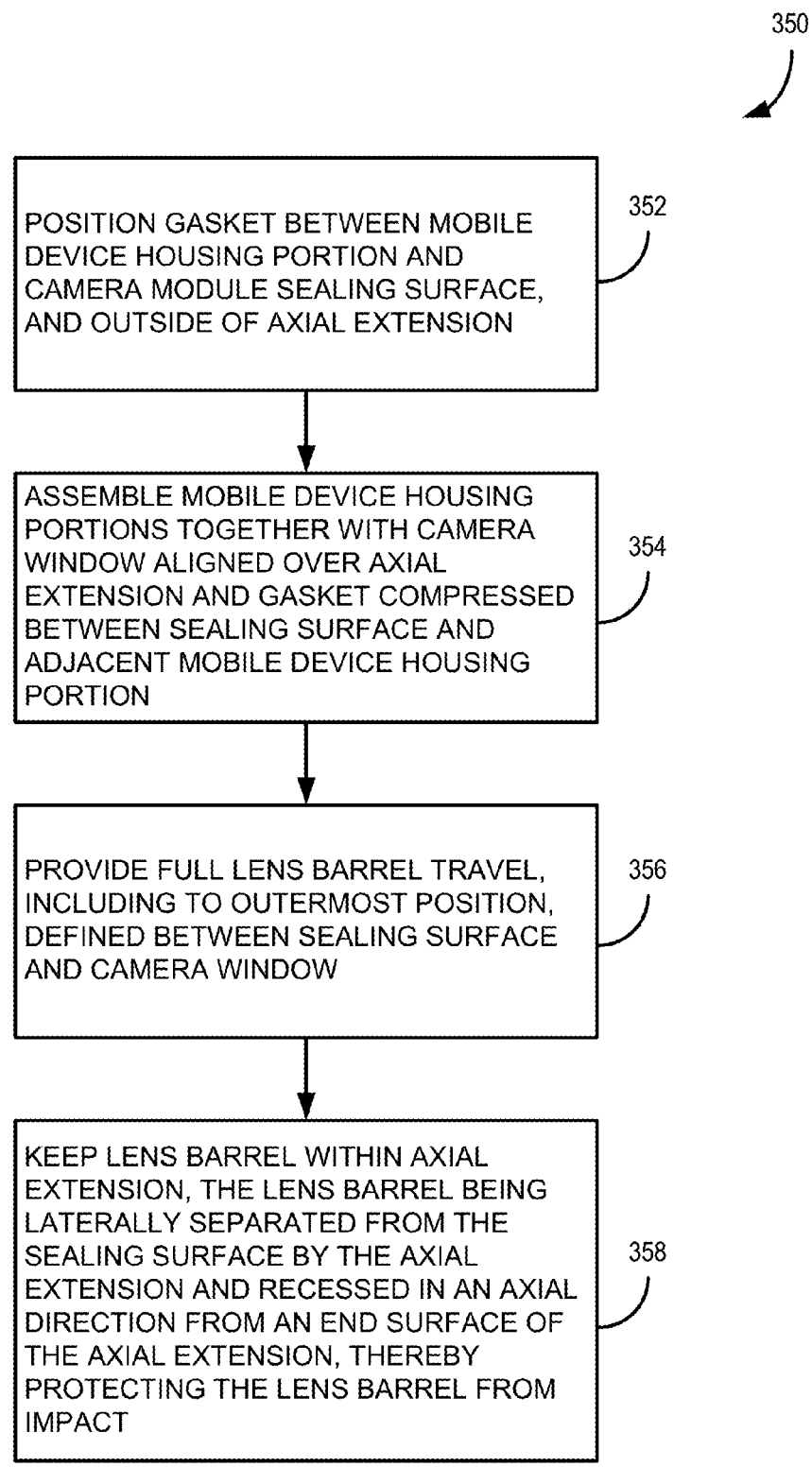
FIG. 3C is a flow chart of a method implementation of achieving a reduced height camera module that provides protection for the lens barrel.

FIG. 3C is a flow chart of a representative method implementation 350 of achieving a thinner mobile device by providing it with a reduced height camera module. In step 352, a gasket is positioned between a housing portion of a mobile device and a sealing surface of a camera module positioned outside of an axial extension that houses a lens barrel of the camera module.

In step 354, multiple housing portions of the mobile device are assembled together with a camera window aligned over the axial extension and with the gasket compressed between the sealing surface and the adjacent housing portion.

In step 356, full lens barrel travel is provided, including to an outermost portion defined between the sealing surface and the camera window of the housing portion. Thus, the lens can be extended beyond the sealing surface, but the lens remains separated from the gasket.

In step 358, the lens barrel is kept within the axial extension. The lens barrel is laterally separated from the gasket by the axial extension. In addition, the lens barrel is recessed in an axial direction from an end surface of the axial extension. As a result, the lens barrel is protected by the axial extension from impact. Specifically, for example in the event that the mobile device is dropped, if the housing portion in the area of the camera window is deflected inwardly, the lens barrel is protected by the axial extension.

Figure 4:
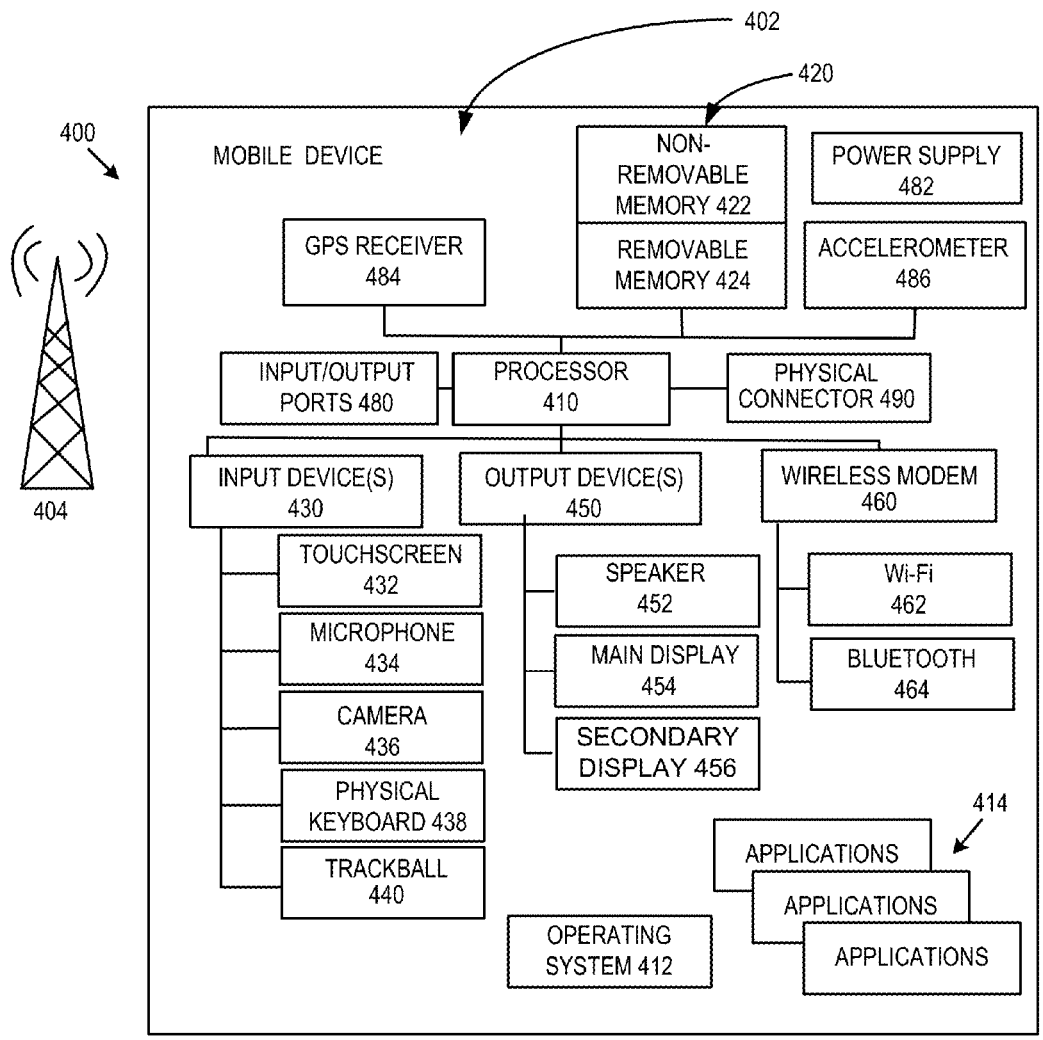
FIG. 4 is a schematic diagram depicting an exemplary mobile device with which any of the disclosed implementations can be used.

FIG. 4 is a system diagram depicting an exemplary mobile device 400 including a variety of optional hardware and software components, shown generally at 402. Any components 402 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 404, such as a cellular or satellite network.

The illustrated mobile device 400 can include a controller or processor 410 (e.g., signal processor, microprocessor, ASIC, or other control and processing logic circuitry) for performing such tasks as signal coding, data processing, input/output processing, power control, and/or other functions. An operating system 412 can control the allocation and usage of the components 402 and support for one or more application programs 414. The application programs can include common mobile computing applications (e.g., email applications, calendars, contact managers, web browsers, messaging applications), or any other computing application.

The illustrated mobile device 400 can include memory 420. Memory 420 can include non-removable memory 422 and/or removable memory 424. The non-removable memory 422 can include RAM, ROM, flash memory, a hard disk, or other well-known memory storage technologies. The removable memory 424 can include flash memory or a Subscriber Identity Module (SIM) card, which is well known in GSM communication systems, or other well-known memory storage technologies, such as "smart cards." The memory 420 can be used for storing data and/or code for running the operating system 412 and the applications 414. Example data can include web pages, text, images, sound files, video data, or other data sets to be sent to and/or received from one or more network servers or other devices via one or more wired or wireless networks. The memory 420 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 400 can support one or more input devices 430, such as a touchscreen 432, microphone 434, camera 436 (e.g., having any of the described camera modules), physical keyboard 438, trackball 440 and one or more output devices 450, such as a speaker 452, a main display 454, and/or one or more secondary displays 456. Other possible output devices (not shown) can include piezoelectric or other haptic output devices. Some devices can serve more than one input/output function. For example, touchscreen 432 and displays 454, 456 can be combined in a single input/output device. The input devices 430 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 412 or applications 414 can comprise speech-recognition software as part of a voice user interface that allows a user to operate the device 400 via voice commands. Further, the device 400 can comprise input devices and software that allows for user interaction via a user's spatial gestures, such as detecting and interpreting gestures to provide input to a gaming application.

A wireless modem 460 can be coupled to an antenna (not shown) and can support two-way communications between the processor 410 and external devices, as is well understood in the art. The modem 460 is shown generically and can include a cellular modem for communicating with the mobile communication network 404 and/or other radio-based modems (e.g., Bluetooth 464 or Wi-Fi 462). The wireless modem 460 is typically configured for communication with one or more cellular networks, such as a GSM network for data and voice communications within a single cellular network, between cellular networks, or between the mobile device and a public switched telephone network (PSTN).

The mobile device can further include at least one input/output port 480, a power supply 482, a satellite navigation system receiver 484, such as a Global Positioning System (GPS) receiver, an accelerometer 486, and/or a physical connector 490, which can be a USB port, IEEE 1394 (FireWire) port, and/or RS-232 port. The illustrated components 402 are not required or all-inclusive, as any components can be deleted and other components can be added.

Figure 5:
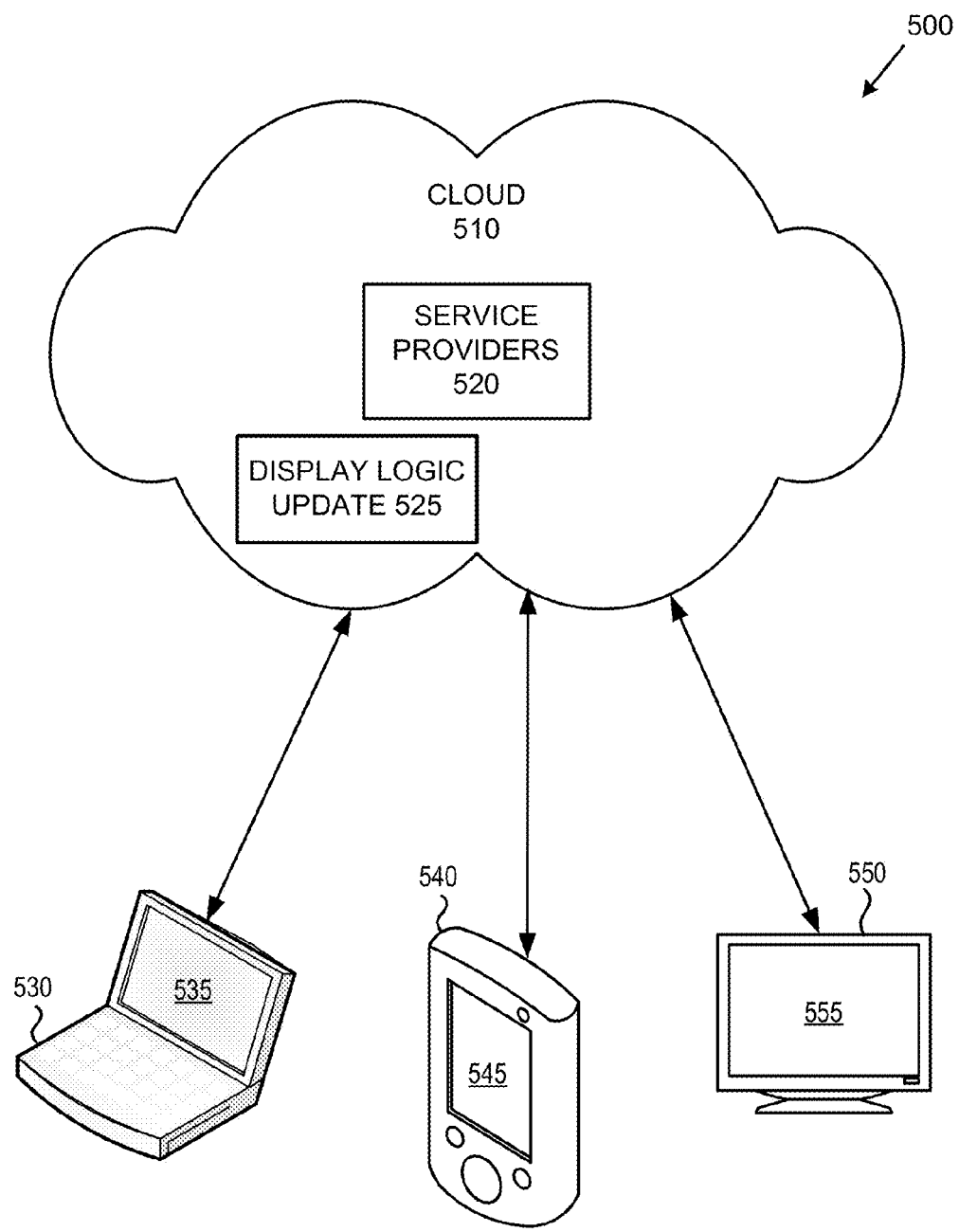
FIG. 5 is a schematic diagram illustrating a generalized example of a suitable implementation environment.

FIG. 5 illustrates a generalized example of a suitable implementation environment 500 in which described embodiments, techniques, and technologies may be implemented.

In example environment 500, various types of services (e.g., computing services) are provided by a cloud 510. For example, the cloud 510 can comprise a collection of computing devices, which may be located centrally or distributed, that provide cloud-based services to various types of users and devices connected via a network such as the Internet. The implementation environment 500 can be used in different ways to accomplish computing tasks. For example, some tasks (e.g., processing user input and presenting a user interface) can be performed on local computing devices (e.g., connected devices 530, 540, 550) while other tasks (e.g., storage of data to be used in subsequent processing) can be performed in the cloud 510.

In example environment 500, the cloud 510 provides services for connected devices 530, 540, 550 with a variety of screen capabilities. Connected device 530 represents a device with a computer screen 535 (e.g., a mid-size screen). For example, connected device 530 could be a personal computer such as desktop computer, laptop, notebook, netbook, or the like. Connected device 540 represents a device with a mobile device screen 545 (e.g., a small size screen). For example, connected device 540 could be a mobile phone, smart phone, personal digital assistant, tablet computer, or the like. Connected device 550 represents a device with a large screen 555. For example, connected device 550 could be a television screen (e.g., a smart television) or another device connected to a television (e.g., a set-top box or gaming console) or the like. One or more of the connected devices 530, 540, 550 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 500. For example, the cloud 510 can provide services for one or more computers (e.g., server computers) without displays.

Services can be provided by the cloud 510 through service providers 520, or through other providers of online services (not depicted). For example, cloud services can be customized to the screen size, display capability, and/or touchscreen capability of a particular connected device (e.g., connected devices 530, 540, 550). In some embodiments, connected devices having more than one display can communicate with the cloud 510 to receive updates 525 and/or changes to their display logic, such as the change way in which the different screens are used to perform various functions.

In example environment 500, the cloud 510 provides the technologies and solutions described herein to the various connected devices 530, 540, 550 using, at least in part, the service providers 520. For example, the service providers 520 can provide a centralized solution for various cloud-based services. The service providers 520 can manage service subscriptions for users and/or devices (e.g., for the connected devices 530, 540, 550 and/or their respective users).

Figure 6:
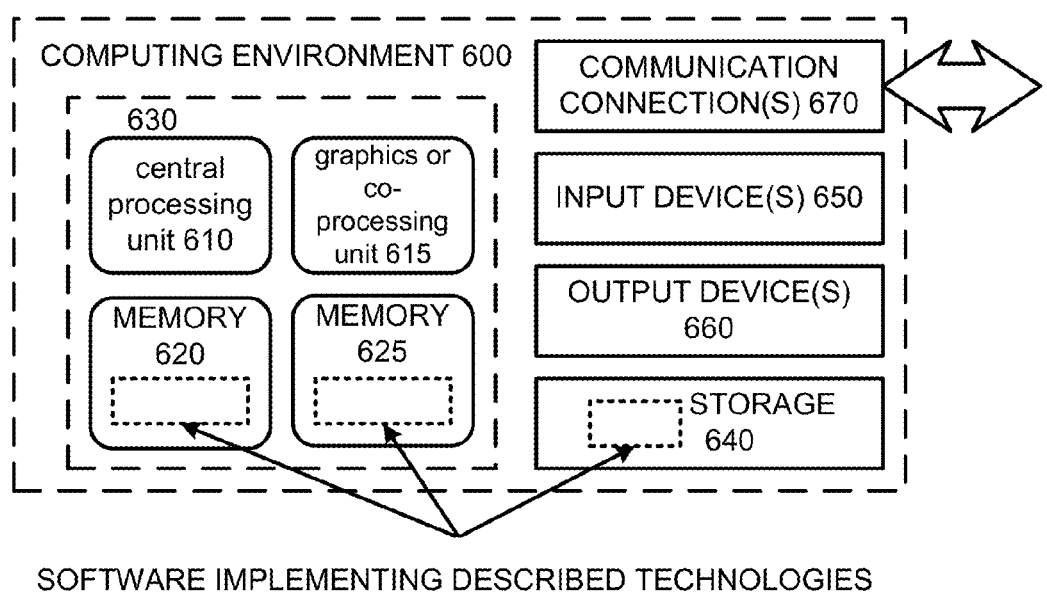
FIG. 6 is a schematic diagram illustrating a generalized example of a suitable computing environment in which the disclosed implementations may be used.

FIG. 6 depicts a generalized example of a suitable computing environment 600 in which the described innovations may be implemented. The computing environment 600 is not intended to suggest any limitation as to scope of use or functionality, as the innovations may be implemented in diverse general-purpose or special-purpose computing systems. For example, the computing environment 600 can be any of a variety of computing devices (e.g., desktop computer, laptop computer, server computer, tablet computer, media player, gaming system, mobile device, etc.)

With reference to FIG. 6, the computing environment 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), a graphics processing unit (GPU), a processor in an application-specific integrated circuit (ASIC), or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 in the form of computer-executable instructions suitable for execution by the processing unit(s).

A computing system may have additional features. For example, the computing environment 600 includes storage 640, one or more input devices 650, one or more output devices 660, and one or more communication connections 670. An interconnection mechanism (not shown) such as a bus, controller, or network interconnects the components of the computing environment 600. Typically, operating system software (not shown) provides an operating environment for other software executing in the computing environment 600, and coordinates activities of the components of the computing environment 600.

The tangible storage 640 may be removable or non-removable, and includes magnetic disks, magnetic tapes or cassettes, CD-ROMs, DVDs, or any other storage device which can be used to store information and which can be accessed within the computing environment 600. The storage 640 stores instructions for the software 680.

The input device(s) 650 may be a touch input device such as a touchscreen, keyboard, switch, mouse, pen or trackball, a voice input device, a scanning device, or another device that provides input to the computing environment 600. For video encoding, the input device(s) 650 may be a camera, video card, TV tuner card, or similar device that accepts video input in analog or digital form, or a CD-ROM or CD-RW that reads video samples into the computing environment 600. The output device(s) 660 may be one or more displays, printer, speaker, CD-writer, or another device that provides output from the computing environment 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Any of the disclosed methods can be implemented as computer-executable instructions stored on one or more computer-readable storage media (e.g., one or more optical media discs, volatile memory components (such as DRAM or SRAM), or nonvolatile memory components (such as flash memory or hard drives)) and executed on a computer (e.g., any commercially available computer, including smart phones, tablets, or other mobile devices that include computing hardware). As should be readily understood, the term computer-readable storage media does not include communication connections, such as modulated data signals. Any of the computer-executable instructions for implementing the disclosed techniques as well as any data created and used during implementation of the disclosed embodiments can be stored on one or more computer-readable media (which excludes propagated signals). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

I claim:

1. A camera module for a mobile device, comprising:
a cover having an outer side from which an annular axial extension protrudes, the axial extension defining a lens opening and a lens movement axis, the axial extension having an outer end surface defining an outer end of the camera module,
wherein the outer side of the cover laterally adjacent the axial extension defines a gasket sealing surface against which a gasket can be compressed for sealing, and wherein the axial extension extends axially beyond the gasket sealing surface;
a base defining an inner end of the camera module opposite the outer end; and a lens barrel positioned within the camera module and drivable to extend and retract relative to the base and within the axial extension, wherein the lens barrel at an outermost position is positioned axially beyond the gasket sealing surface and recessed from the outer end surface of the axial extension and is separated laterally from the gasket sealing surface by the axial extension.

2. The camera module of claim 1, wherein the gasket sealing surface is configured for positioning opposite a periphery of a camera window of a mobile device with a gasket positioned between the gasket sealing surface and the periphery of the camera window.

3. The camera module of claim 1, wherein the cover and the axial extension are formed as a single-piece construction.

4. The camera module of claim 1, wherein a height of the camera module measured from the base to the outer end surface is at least 0.2 mm less than a comparable conventional camera module of a mobile device.

5. The camera module of claim 1, wherein a height of the camera module measured from the base to the outer end surface is at least 0.4 mm less than a comparable conventional camera module of a mobile device.

6. The camera module of claim 1, wherein in the outermost position, the lens barrel is positioned beyond the sealing surface toward the outer end surface of the axial extension by at least 0.2 mm.

7. The camera module of claim 1, wherein an axial separation distance between an end of the lens barrel and a window of the camera is not greater than about 0.40 mm.

8. The camera module of claim 1, wherein a lateral clearance between a side of the lens barrel and a closest portion of the lens opening is not greater than about 0.80 mm.

9. The camera module of claim 1, wherein the axial extension is joined to the gasket sealing surface at a shoulder, and wherein the shoulder is configured for contact by the gasket.

10. The camera module of claim 1, wherein the axial extension is joined to the gasket sealing surface at a shoulder, and wherein the shoulder is configured to remain inwardly spaced from the gasket.

11. A mobile device with a camera module, comprising:
a mobile device housing portion having a camera window that defines a camera axis;
a camera module positioned within the mobile device and aligned with the camera window along the camera axis, the camera module having an outer sealing surface sized at least as great as a periphery of the camera window; and
an annular dust gasket positioned between the sealing surface and the camera window to define a sealed area between the camera module and the camera window;
wherein the camera module comprises an axial extension extending axially beyond the outer sealing surface toward the camera window and having an end surface, and wherein the camera module has a lens barrel drivable along the camera axis to an outermost position within the axial extension and axially beyond the sealing surface and recessed from the end surface, thereby protecting the lens barrel from shock and from contamination.

12. The mobile device of claim 11, wherein the housing portion is a first housing portion defining a back surface of the mobile device, further comprising a second housing portion defining a front surface arranged opposite the first portion to define an interior space, and wherein the camera module has a base positioned adjacent or in contact with the second housing portion.

13. The mobile device of claim 11, wherein the end surface of the camera module is closely spaced from the camera window.

14. The mobile device of claim 11, wherein the camera module comprises a one-piece cover that defines the sealing surface and the axial extension.

15. The mobile device of claim 14, wherein the cover is made of a metal.

16. The mobile device of claim 14, wherein the cover comprises a mounting flange extending laterally outwardly from the sealing surface and axially toward the base, the mounting flange comprising at least one aperture for receiving a mounting fastener to secure the camera module in place.

17. The mobile device of claim 14, wherein the cover comprises a two-step profile.

18. A method of assembling a mobile device to reduce the height of the mobile device, comprising:
providing a first mobile device housing portion;
providing a camera module having a base defining one end and an opposite second end defined by an axial extension with an opening for a lens barrel and a surrounding sealing surface, wherein the axial extension extends axially beyond the sealing surface;
assembling the base of the camera module near or in contact with an inner surface of the first mobile device housing portion;
positioning a gasket on the sealing surface and around the axial extension;
providing a second mobile device housing portion with a camera window; and
assembling the second mobile device housing portion with the first mobile device housing portion, with the camera window aligned with the opening and the lens barrel, and with the gasket compressed between the second mobile device housing portion and the sealing surface of the camera module, the lens barrel being drivable away from the base and within the axial extension to a position beyond the sealing surface toward the camera window, the lens barrel remaining separated from the gasket by the axial extension.

19. The method of claim 17, further comprising providing a lateral clearance between the lens barrel and a closest point on an inner surface of the axial extension so that the lens barrel does not contact the axial extension during movement of the lens barrel.

20. The method of claim 17, wherein the lens barrel is extendable axially to an outermost position away from the base and beyond the sealing surface but within the axial extension, thereby reducing the height of the mobile device.

* * * * *